(12) United States Patent
Lee et al.

(10) Patent No.: US 8,412,448 B2
(45) Date of Patent: Apr. 2, 2013

(54) COLLISION AVOIDANCE SYSTEM AND METHOD

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 435 days.

(21) Appl. No.: 12/791,884

(22) Filed: Jun. 2, 2010

(65) Prior Publication Data
US 2011/0196569 A1    Aug. 11, 2011

(30) Foreign Application Priority Data
Feb. 8, 2010  (TW) .............................. 99103734 A

(51) Int. Cl.
*G06F 17/10*    (2006.01)
(52) U.S. Cl. ...................................... 701/301; 701/300
(58) Field of Classification Search ........... 701/300–301
See application file for complete search history.

(56) References Cited

U.S. PATENT DOCUMENTS

| 2001/0020217 | A1* | 9/2001 | Matsuno | 701/301 |
| 2010/0030474 | A1* | 2/2010 | Sawada | 701/301 |
| 2010/0199283 | A1* | 8/2010 | Kido et al. | 718/103 |
| 2011/0163904 | A1* | 7/2011 | Alland et al. | 342/1 |
| 2011/0169626 | A1* | 7/2011 | Sun et al. | 340/439 |

* cited by examiner

*Primary Examiner* — Hussein A. Elchanti
(74) *Attorney, Agent, or Firm* — Altis Law Group, Inc.

(57) ABSTRACT

A collision avoidance system and method creates 3D models of objects by collecting character data of the objects, and controls a camera of a vehicle to capture an image in front of the vehicle. The system determines whether an object is detected in front of the vehicle by comparing the image with each of the 3D models, analyzes a distance between the camera and the object according to the image, and determines whether the distance is less than a safety distance. The system controls the warning device to alarm when the distance is less than the safety distance, and automatically controls the brake system to reduce a speed of the vehicle if the vehicle is not decelerating.

16 Claims, 3 Drawing Sheets

COLLISION AVOIDANCE SYSTEM AND METHOD

BACKGROUND

1. Technical Field

Embodiments of the present disclosure relate generally to monitoring systems and methods, and more particularly to a collision avoidance system and method.

2. Description of Related Art

A vehicle monitor system can record the scene in front of a vehicle while the vehicle is being driven, and display the scene to analyze the responsibility of a traffic emergency after a vehicle collision between the vehicle and an obstacle happens. However, the vehicle monitor system cannot generate an alarm to caution the driver, and also cannot brake the vehicle automatically or reduce the driving speed to avoid the vehicle collision.

What is needed, therefore, is a system and method which can monitor movement of the vehicle and the obstacle, so as to prevent the vehicle collision.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
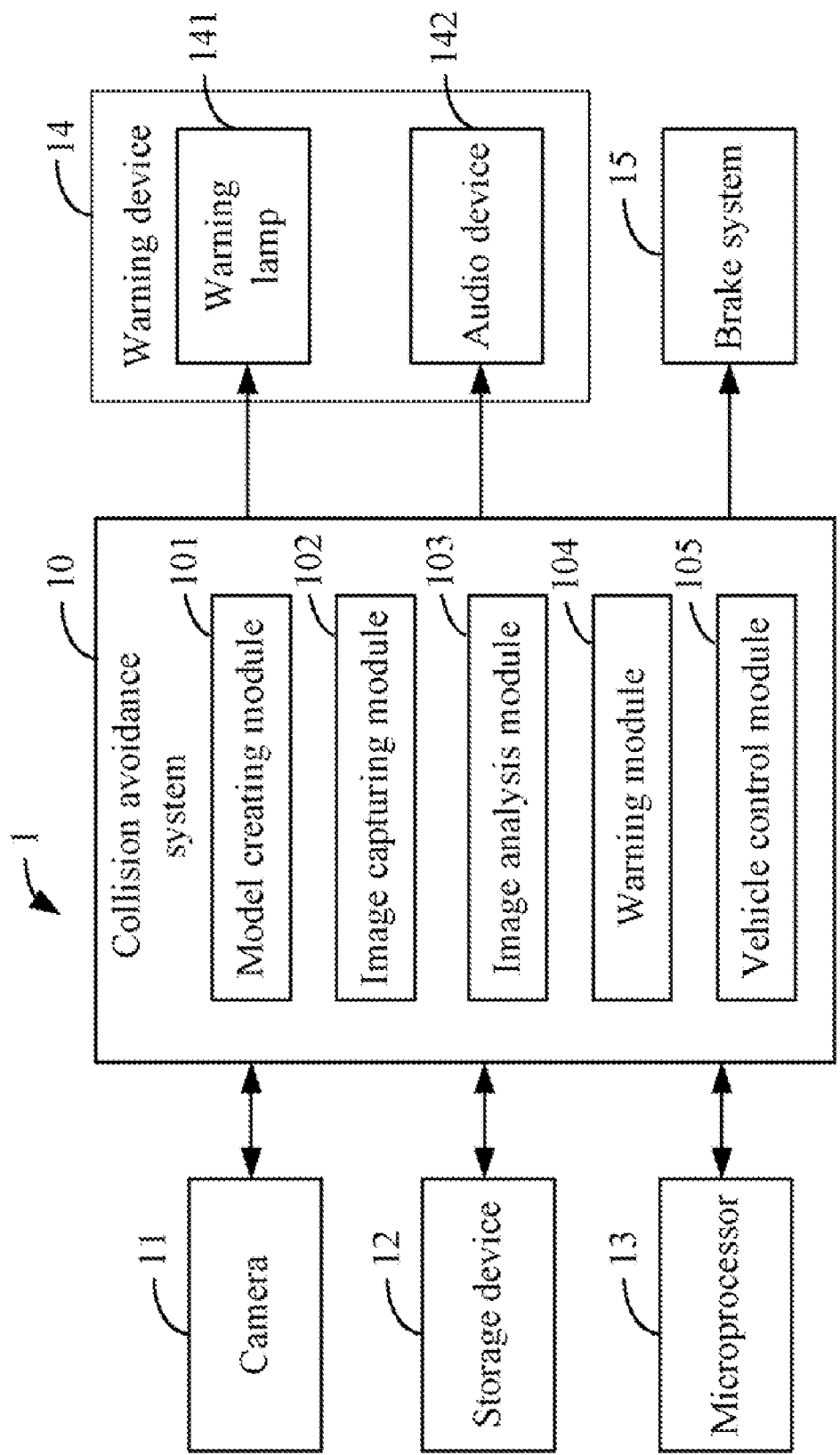
FIG. 1 is a schematic diagram of one embodiment of a vehicle including a collision avoidance system.

FIG. 1 is a schematic diagram of one embodiment of a vehicle 1 including a collision avoidance system 10 that can be used to monitor movement of the vehicle 1, so as to prevent a collision of the vehicle 1 with an obstacle while the vehicle 1 is being driven. In one embodiment, the vehicle 1 can be a car, a truck, a bus, or a train, for example. The vehicle 1 may further include a camera 11, a storage device 12, a microprocessor 13, a warning device 14, and a brake system 15. The warning device 14 includes a warning lamp 141 and an audio device 142. Each of the components 10-15 can communicate with each other through electrical wires embedded in the vehicle 1. It should be apparent that FIG. 1 shows only one example of an architecture for the vehicle 1 and may include more or fewer components than shown, or a different configuration of the various components in other embodiments.

The collision avoidance system 10 may include a plurality of functional modules comprising one or more computerized instructions that are stored in the storage device 12. In one embodiment, the camera 11 is a time of flight (TOF) camera device that is positioned in front of the vehicle 1 to capture images in front of the vehicle 1. The storage device 12 may be an internal storage device, such as a random access memory (RAM) for temporary storage of information and/or a read only memory (ROM) for permanent storage of information. The storage device 12 may also be an external storage device, such as a hard disk, a storage card, or a data storage medium. The microprocessor 13 runs various software modules stored in the storage device 12 to perform various functions for monitoring the vehicle collision between the vehicle 1 and an object. In one embodiment, the object is described as an obstruction that may collide with the vehicle 1 to generate a traffic emergency, such as a person, an animal, or other vehicles.

In one embodiment, the collision avoidance system 10 may include a model creating module 101, an image capturing module 102, an image analysis module 103, a warning module 104, and a vehicle control module 105. One or more computerized codes of the function modules 101-105 may be stored in the storage device 12 and executed by the microprocessor 13. In general, the word "module," as used herein, refers to logic embodied in hardware or firmware, or to a collection of software instructions, written in a programming language. The software instructions in the modules may be embedded in firmware, such as an EPROM. The modules described herein may be implemented as either software and/or hardware modules and may be stored in any type of computer-readable medium or other storage device.

The model creating module 101 is operable to create 3D models of different objects by collecting multiple character data of the different objects, such as people, animals, or other vehicles. The 3D models are stored in the storage device 12. Each of the 3D models may include character data such as person characters, animal characters, or vehicle characters. In one embodiment, the character data of a person may be pre-captured using the camera 11, where the person's character data may include the person's facial features such as nose, eyes and mouth data, and width and height of the person. The model creating module 101 further constructs a 3D model of the person according to the person's character data.

Figure 3:
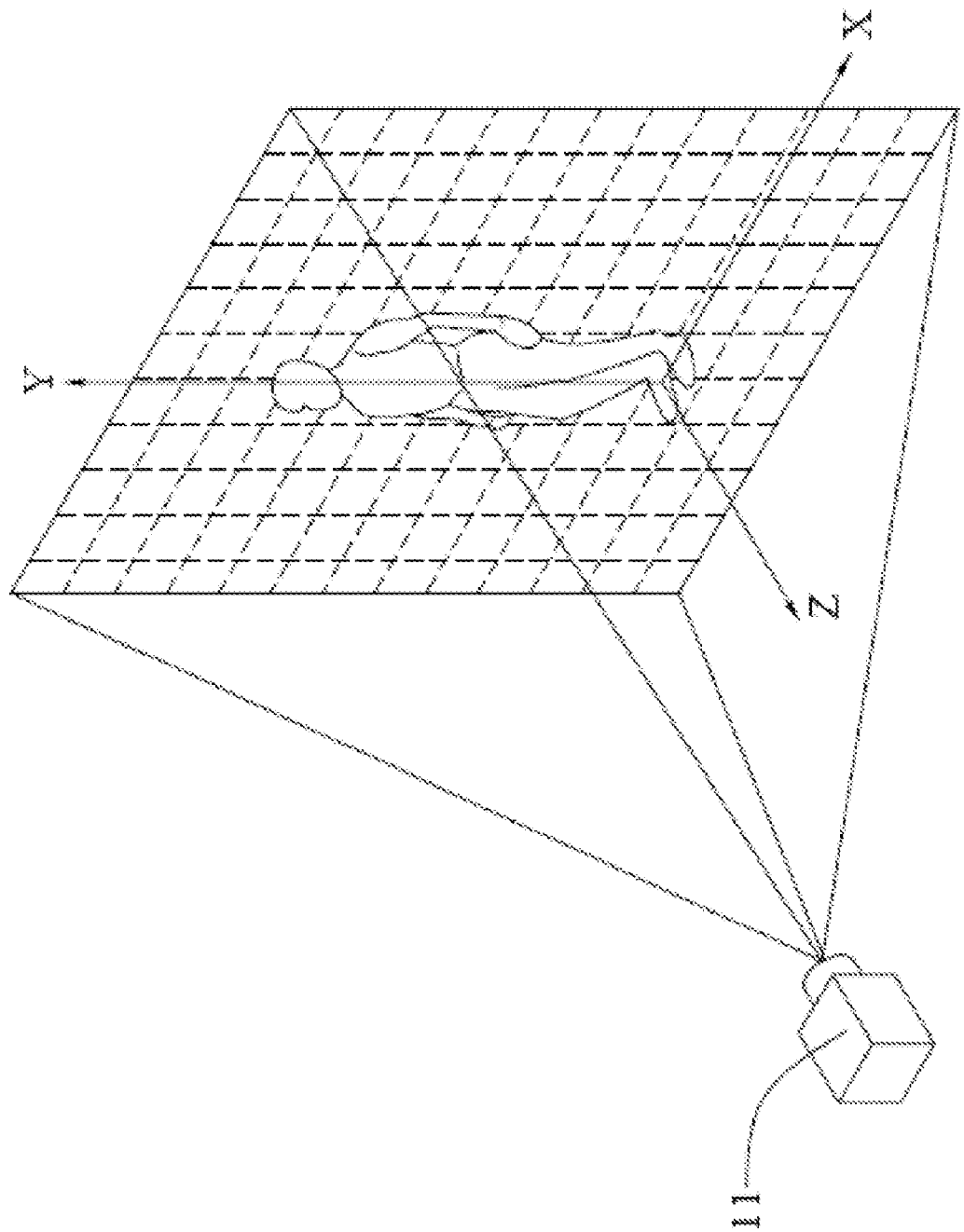
FIG. 3 is a schematic diagram illustrating an example of a image in front of a vehicle while driving the vehicle.

The image capturing module 102 is operable to control the camera 11 to capture a image that is in front of the vehicle 1. In one embodiment, the image may include image data and distance information between the camera 11 and the object. Referring to FIG. 3, the camera 11 captures an image of the person in front of the vehicle 1. The person image can be described as a 3D coordinates system that include X-Y coordinate image data, and Z-coordinate distance data. In one embodiment, the X-coordinate value represents a width of the person image, such as 20 cm. The Y-coordinate value represents a height of the person image, such as 160 cm. The Z-coordinate distance data represents a distance between the camera 11 and the person, which can be calculated by analyzing the person image.

The image analysis module 103 is operable to extract image data from the image, and determine whether an object is detected in front of the vehicle 1 by comparing the image with each of the 3D models based on the image data. In detail, the image analysis module 103 compares the image data with the character data of each of the 3D models, to determine whether an object is in front of the vehicle 1 according to the comparison. The image analysis module 103 is further operable to analyze a distance between the camera 11 and the object according to the image, and determine whether the distance is less than a predefined safety distance. The safe distance can be preset by the driver according to the speed of the vehicle 1. For example, the driver may set 50 meters as a safe distance between the vehicle 1 and the object in front of the vehicle 1.

The warning module 104 is operable to control the warning device 14 to alarm if the distance is less than the safe distance. In one embodiment, when the distance is less than the safe distance, the warning module 104 controls the warning lamp 141 to flash or the audio device 142 to generate an alarm sound, to caution the driver to decelerate the vehicle 1.

The vehicle control module 105 is operable to check whether the vehicle 1 is decelerating, and control the brake system 15 to decelerate the vehicle 1 or stop the vehicle 1 automatically if the vehicle 1 is not decelerating, to avoid a vehicle collision between the vehicle 1 and the object. In one embodiment, if a speed of the vehicle 1 is over 20 kilometer per hour (kph), the vehicle control module 105 controls the brake system 15 to decelerate the vehicle 1. If the speed is less than 20 kph, the vehicle control module 105 controls the brake system 15 to stop the vehicle 1.

Figure 2:
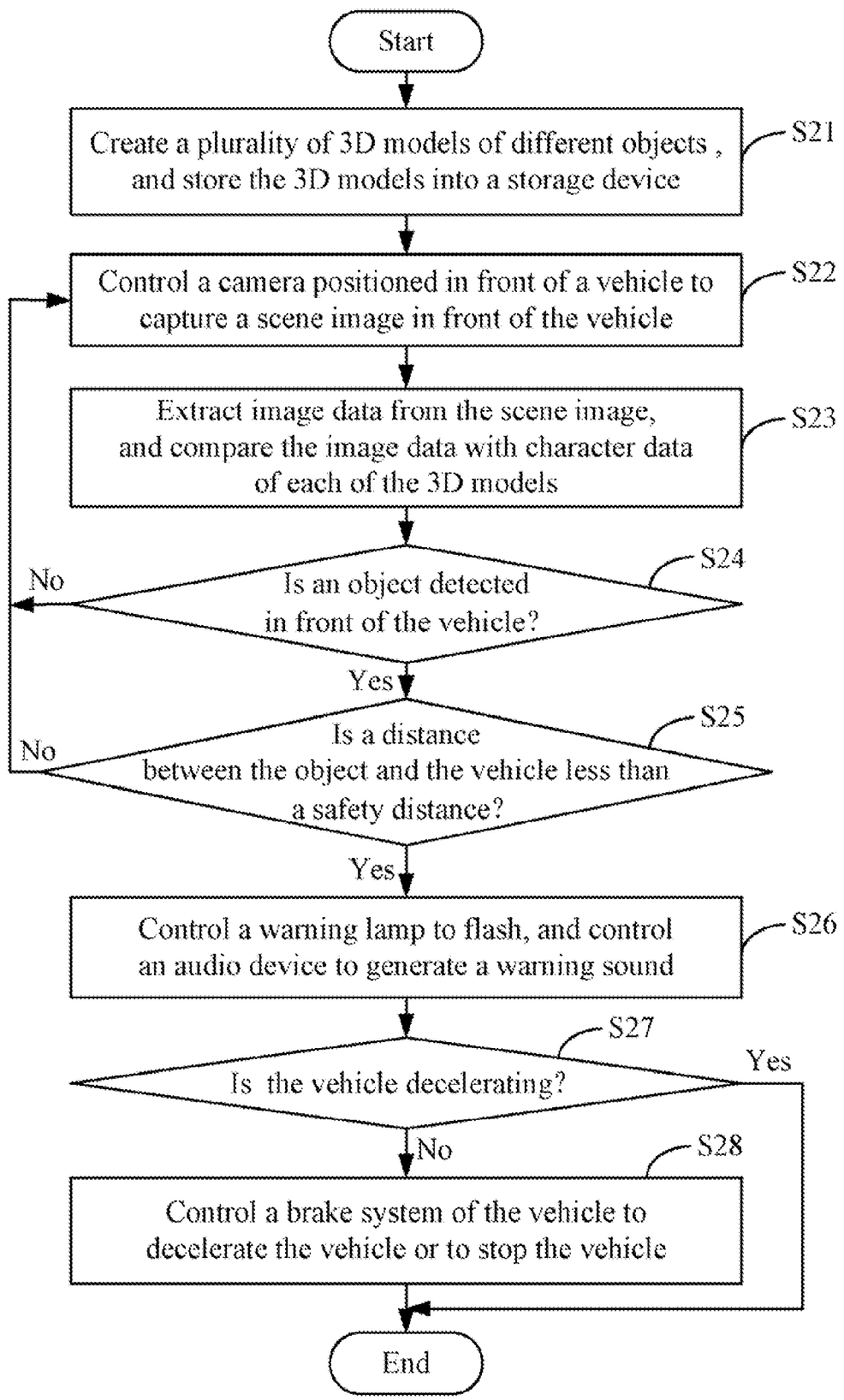
FIG. 2 is a flowchart of one embodiment of a collision avoidance method using a system such as, for example, that of FIG. 1.

FIG. 2 is a flowchart of one embodiment of a collision avoidance method using a system such as, for example, that of FIG. 1. The monitor method is used to monitor movement of the vehicle 1, so as to prevent a collision of the vehicle 1 with an obstacle while the vehicle 1 is being driven. Depending on the embodiment, additional blocks may be added, others removed, and the ordering of the blocks may be changed.

In block S21, the model creating module 101 creates 3D models of different objects, and stores the 3D models into the storage device 12. As mentioned above, each of the objects is described as an obstruction that may collide with the vehicle 1 to generate a traffic emergency, such as a person, an animal, or other vehicles. Each of the 3D models may include character data such as person characters, animal characters, or vehicle characters. In one embodiment, the character data of a person may be pre-captured using the camera 11, where the person's character data may include the person's facial features such as nose, eyes and mouth data, and width and height of the person. The model creating module 101 further constructs a 3D model of the person according to the person's character data.

In block S22, the image capturing module 102 controls the camera 11 to capture an image that is in front of the vehicle 1. In one embodiment, the image may include image data and distance information between the camera 11 and the object. Referring to FIG. 3, the camera 11 captures an image of the person in front of the vehicle 1. The person image can be described as a 3D coordinates system that include X-Y coordinate image data, and Z-coordinate distance data. In one embodiment, the X-coordinate value represents a width of the person image, such as 20 cm. The Y-coordinate value represents a height of the person image, such as 160 cm. The Z-coordinate distance data represents a distance between the camera 11 and the person, and can be calculated by analyzing the person image.

In block S23, the image analysis module 103 extracts image data from the image, and compares the image data with the character data of each of the 3D models. In block S24, the image analysis module 103 determines whether an object is detected in front of the vehicle 1 according to the comparison result. If no object is detected in front of the vehicle 1, block S22 is repeated. Otherwise, if an object is detected in front of the vehicle 1, block S25 is implemented.

In block S25, the image analysis module 103 analyzes a distance between the camera 11 and the object according to the image, and determines whether the distance is less than a predefined safety distance. The safety distance can be preset by the driver according to the speed of the vehicle 1. For example, the driver may set 50 meters as a safety distance between the vehicle 1 and the object in front of the vehicle 1. If the distance is not less than the safety distance, block S22 is repeated. Otherwise, if the distance is less than the safety distance, block S26 is implemented.

In block S26, the warning module 104 controls the warning device 14 to alarm when any object is detected in front of the vehicle 1. In one embodiment, if an object is detected in front of the vehicle 1, the warning module 104 controls the warning lamp 141 to flash and/or the audio device 142 to generate an alarm sound, to caution the driver to decelerate the vehicle 1.

In block S27, the vehicle control module 105 checks whether the vehicle 1 is decelerating. If the vehicle 1 is not decelerating, block S28 is implemented. Otherwise, if the vehicle 1 is decelerating, the flow is ended. In block S28, the vehicle control module 105 controls the brake system 15 to decelerate the vehicle 1 or stop the vehicle 1, to avoid a vehicle collision between the vehicle 1 and the object. In one embodiment, if a speed of the vehicle 1 is over 20 kph, the vehicle control module 105 controls the brake system 15 to decelerate of the vehicle 1. If the speed is less than 20 kph, the vehicle control module 105 controls the brake system 15 to stop the vehicle 1.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A vehicle, comprising:
 a storage device;
 at least one microprocessor; and
 a collision avoidance system stored in the storage device and executed by the at least one microprocessor, the collision avoidance system comprising:
 a model creating module operable to construct a plurality of 3D models of objects by collecting character data of the objects;
 a image capturing module operable to control a camera positioned in front of the vehicle to capture an image in front of the vehicle;
 an image analysis module operable to extract image data from the image, compare the image data with the character data of each of the 3D models to determine whether an object is detected in front of the vehicle, analyze a distance between the camera and the object according to the image, and determine whether the distance is less than a predefined safety distance;
 a warning module operable to control a warning device of the vehicle to alarm if the distance is less than the safety distance; and
 a vehicle control module operable to check whether the vehicle is decelerating, and automatically control a brake system of the vehicle to decelerate the vehicle if the vehicle is not decelerating, so as to avoid a vehicle collision between the vehicle and the object.

2. The vehicle according to claim 1, wherein the model creating module is further operable to store the character data of the 3D models into a storage device of the vehicle.

3. The vehicle according to claim 1, wherein the camera is a time of flight (TOF) camera that is positioned in front of the vehicle.

4. The vehicle according to claim 1, wherein the safety distance is preset by a driver according to a speed of the vehicle.

5. The vehicle according to claim 1, wherein the warning device comprises a warning lamp for flashing when any object is detected in front of the vehicle.

6. The vehicle according to claim 1, wherein the warning device comprises an audio device for generating an alarm sound when any object is detected in front of the vehicle.

7. A collision avoidance method being executed by at least one microprocessor of a vehicle, the method comprising:
 creating a plurality of 3D models of objects by collecting character data of the objects;

controlling a camera positioned in front of the vehicle to capture an image in front of the vehicle while the vehicle is being driven;

extracting image data from the image;

determining whether an object is detected in front of the vehicle by comparing the image data with the character data of each of the 3D models;

analyzing a distance between the camera and the object according to the image if the object is detected in front of the vehicle;

determining whether the distance is less than a predefined safety distance;

controlling a warning device of the vehicle to alarm if the distance is less than the safety distance;

checking whether the vehicle is decelerating; and controlling a brake system of the vehicle to decelerate the vehicle if the vehicle is not decelerating, so as to avoid a vehicle collision between the vehicle and the object.

8. The method according to claim 7, further comprising: storing the character data of the 3D models into a storage device of the vehicle.

9. The method according to claim 7, wherein the step of controlling the warning device to alarm comprises:

controlling a warning lamp of the warning device to flash; and controlling an audio device of the warning device to generate an alarm sound to caution a driver to decelerate the vehicle.

10. The method according to claim 7, wherein the camera is a time of flight (TOF) camera that is positioned in front of the vehicle.

11. The method according to claim 7, wherein the safety distance is preset by a driver according to a speed of the vehicle.

12. A non-transitory storage medium having stored thereon instructions that, when executed by a microprocessor of a vehicle, causes the vehicle to perform a collision avoidance method, the method comprising:

creating a plurality of 3D models of objects by collecting character data of the objects;

controlling a camera positioned in front of the vehicle to capture an image in front of the vehicle;

extracting image data from the image;

determining whether an object is detected in front of the vehicle by comparing the image data with the character data of each of the 3D models;

analyzing a distance between the camera and the object according to the image if the object is detected in front of the vehicle;

determining whether the distance is less than a predefined safety distance;

controlling a warning device of the vehicle to alarm if the distance is less than the safety distance;

checking whether the vehicle is decelerating; and controlling a brake system of the vehicle to decelerate the vehicle if the vehicle is not decelerating, so as to avoid a vehicle collision between the vehicle and the object.

13. The non-transitory storage medium according to claim 12, wherein the method further comprises:

storing the character data of the 3D models into a storage device of the vehicle.

14. The non-transitory storage medium according to claim 12, wherein the step of controlling the warning device to alarm comprises:

controlling a warning lamp of the warning device to flash; and controlling an audio device of the warning device to generate an alarm sound to caution a driver to decelerate the vehicle.

15. The non-transitory storage medium according to claim 12, wherein the camera is a time of flight (TOF) camera that is positioned in front of the vehicle.

16. The non-transitory storage medium according to claim 12, wherein the safety distance is preset by a driver according to a speed of the vehicle.

* * * * *